United States Patent
Fu

(10) Patent No.: US 9,001,289 B2
(45) Date of Patent: Apr. 7, 2015

(54) POLARIZING LAYER OF LIQUID CRYSTAL PANEL AND MANUFACTURING METHOD FOR THE SAME

(75) Inventor: Hsin-min Fu, Zhongli (TW)

(73) Assignee: Chunghwa Picture Tubes Ltd., Sade (TW)

( * ) Notice: Subject to any disclaimer, the term of this patent is extended or adjusted under 35 U.S.C. 154(b) by 329 days.

(21) Appl. No.: 13/541,783

(22) Filed: Jul. 5, 2012

(65) Prior Publication Data
US 2013/0258253 A1    Oct. 3, 2013

(30) Foreign Application Priority Data
Mar. 30, 2012   (TW) .............................. 101111485 A

(51) Int. Cl.
*G02F 1/1335*   (2006.01)
*G02B 5/30*   (2006.01)

(52) U.S. Cl.
CPC ........ *G02B 5/3025* (2013.01); *G02F 1/133514* (2013.01); *G02F 1/133528* (2013.01)

(58) Field of Classification Search
None
See application file for complete search history.

(56) References Cited

U.S. PATENT DOCUMENTS

| 6,084,647 A | * 7/2000 | Hatano et al. ................... 349/15 |
| 7,619,712 B2 | 11/2009 | Lai et al. |
| 8,197,708 B2 | * 6/2012 | Cho et al. ................ 252/299.01 |

FOREIGN PATENT DOCUMENTS

| CN | 1789289 | 6/2006 |
| CN | 1789289 | 7/2010 |
| CN | 101311777 | 5/2011 |
| TW | 200502595 | 1/2005 |
| TW | 200842408 | 11/2008 |

* cited by examiner

*Primary Examiner* — Richard Kim
(74) *Attorney, Agent, or Firm* — Mark M. Friedman

(57) ABSTRACT

The present invention discloses a polarizing layer of a liquid crystal panel and manufacturing method thereof. A polarized ultraviolet (UV) light is irradiated on a UV reactive liquid crystal layer to form a polarized UV reactive liquid crystal layer having polarization properties, and it is used as the polarizing layer of the liquid crystal panel. The present invention has advantages of being thin in the thickness thereof, in addition to having high temperature resistance, as well as a simple manufacturing process, thereby reducing production costs.

7 Claims, 6 Drawing Sheets providing a liquid crystal panel having a liquid crystal layer and a pair of substrates, the liquid crystal panel being sandwiched between the substrates — S21 providing a composite film layer, which is formed by doping UV reactive liquid crystal materials into a film layer made of organic polymers, between the liquid crystal layer and one of the substrates — S22 irradiating a polarized UV light on the composite film layer to form the polarizing film layer — S23

POLARIZING LAYER OF LIQUID CRYSTAL PANEL AND MANUFACTURING METHOD FOR THE SAME

BACKGROUND OF THE INVENTION

1. Field of the Invention

The present invention relates to a polarizing layer of a liquid crystal panel and a manufacturing method thereof, and more particularly, to a novel polarizing layer which replaces conventional polarizing plates.

2. Description of the Prior Art

A polarizing plate is one of basic component in a liquid crystal display. The polarizing plate is a transparent plate that only permits light having a particular direction to pass through. In a manufacturing process for a liquid crystal panel, two interlaced polarizing plates are disposed, such that one is disposed above and one disposed below the liquid crystal panel. When a liquid crystal layer receives an external voltage and is controlled thereby, the liquid crystal display is capable of appearing a bright status and a dark status. Thus, the liquid crystal display can be controlled to show images.

A conventional polarizing plate has a multi-layer structure, and a polyvinyl alcohol (PVA) film is usually provided as a polarized substrate due to its molecular stretching characteristic having polarization effect. After the PVA film is stretched, for preventing shrinkage of the PVA film thereafter, two triacetyl cellulose (TAC) films are attached to an upper surface and a lower surface of the stretched PVA film, respectively.

According to the above-mentioned structure, since a polarizing plate is a product of a multi-layer optical film, the quality of raw materials of each film layer, the homogeneousness of a coating process, and the cohesiveness between layers will affect the properties of polarizing plates. Furthermore, the environment for using the polarizing plate can also affect shelf-life thereof. In a high-temperature environment, the polarizing plate will contract, and thus an adhesive being used in bonding the polarizing plate is apt to foaming, peeling, or light leakage.

Therefore, there is a need to provide a novel polarizing plate for replacing the conventional polarizing plates, so as to overcome the disadvantages in the prior art.

BRIEF SUMMARY OF THE INVENTION

The present invention provides a polarizing layer of a liquid crystal panel and manufacturing method thereof for solving problems in the prior art.

An object of the present invention is to provide a polarizing layer of a liquid crystal panel and a manufacturing method thereof. A polarized ultraviolet (UV) light is irradiated on a UV reactive liquid crystal layer to form a polarized UV reactive liquid crystal layer having polarization properties, then it is used as the polarizing layer of the liquid crystal panel. The polarizing layer according to the present invention brings the advantages of being thin in the thickness and a higher temperature resistance, as well as having a simple manufacturing process, thereby reducing production costs.

To achieve the above object, the present invention provides a method for manufacturing the polarizing layer of the liquid crystal panel, such that the method includes the following steps: providing a liquid crystal panel having a liquid crystal layer and a pair of substrates, the liquid crystal layer being sandwiched between the substrates; providing a film layer between the liquid crystal layer and one of the substrates, the film layer having a UV reactive liquid crystal layer provided on a surface thereof; irradiating a polarized UV light on the UV reactive liquid crystal layer, thereby forming the polarizing layer.

In one exemplary embodiment of the present invention, the film layer is selected from a group consisting of a color filter film, an alignment film, a transparent electrode, a gate electrode layer, a gate insulation layer, a source/drain layer, a semiconductor layer, and a protective insulation layer.

In one exemplary embodiment of the present invention, the polarized UV light is formed by a UV light irradiating through a polarizing sheet, and the UV light has a wavelength ranged from 200 nm to 400 nm.

In one exemplary embodiment of the present invention, the pair of substrates are a color filter substrate and a thin film transistor array substrate, respectively.

Furthermore, the present invention provides a method for manufacturing a polarizing layer of a liquid crystal panel, such that the method includes the following steps: providing a liquid crystal panel having a liquid crystal layer and a pair of substrates, the liquid crystal layer being sandwiched between the substrates; providing a composite film layer, which is formed by doping UV reactive liquid crystal materials into a film layer which is made of organic polymers, between the liquid crystal layer and one of the substrates; irradiating a polarized UV light on the composite film layer, thereby forming the polarizing film layer.

In one exemplary embodiment of the present invention, the film layer is a color filter film.

In one exemplary embodiment of the present invention, the composite film layer can be divided into at least three areas, and each of said at least three areas of the composite film layer contains a colorant, and the colorants of the respective areas are different, thereby forming a color polarizing filter film.

In one exemplary embodiment of the present invention, an irradiation process of the polarized UV light further includes using a photo mask for irradiating different areas.

In one exemplary embodiment of the present invention, the polarized UV light is formed by a UV light irradiating through a polarizing sheet, and the UV light has a wavelength ranged from 200 nm to 400 nm.

In one exemplary embodiment of the present invention, the pair of substrates are a color filter substrate and a thin film transistor array substrate, respectively.

The present invention further provides a liquid crystal panel which includes a first substrate, a second substrate, a liquid crystal layer, a first polarizing layer, and a second polarizing layer. The first polarizing layer and the second polarizing layer are made of polarized UV reactive liquid crystal materials having polarization properties. The liquid crystal layer is sandwiched between the first substrate and the second substrate. The first polarizing layer is sandwiched between the first substrate and the liquid crystal layer, and the second polarizing layer is sandwiched between the second substrate and the liquid crystal layer.

In one exemplary embodiment of the present invention, the first polarizing layer can be further divided into at least three areas, and each of said at least three areas of the first polarizing layer contains a colorant, and the colorants of the respective areas are different, thereby forming a color polarizing filter film.

In one exemplary embodiment of the present invention, the first substrate is a color filter substrate, and the second substrate is a thin film transistor array substrate.

A polarizing layer of the liquid crystal panel and the manufacturing method thereof according to the present invention is where a polarized UV light is irradiated on a UV reactive liquid crystal layer to form a polarized UV reactive liquid crystal layer having polarization properties, for it is utilized as the polarizing layer of the present invention. Advantages of the present invention in comparison to prior art, in addition to a reduction of a thickness of a liquid crystal display, and an improvement of temperature resistance of the liquid crystal display, the present invention also provides a simple manufacturing process, thereby reducing production costs.

DETAILED DESCRIPTION OF THE PREFERRED EMBODIMENTS

Embodiments of the present invention are described in detail with the technical matters, structural features, achieved objects and effects with reference to the accompanying drawings as follows.

Figure 1:
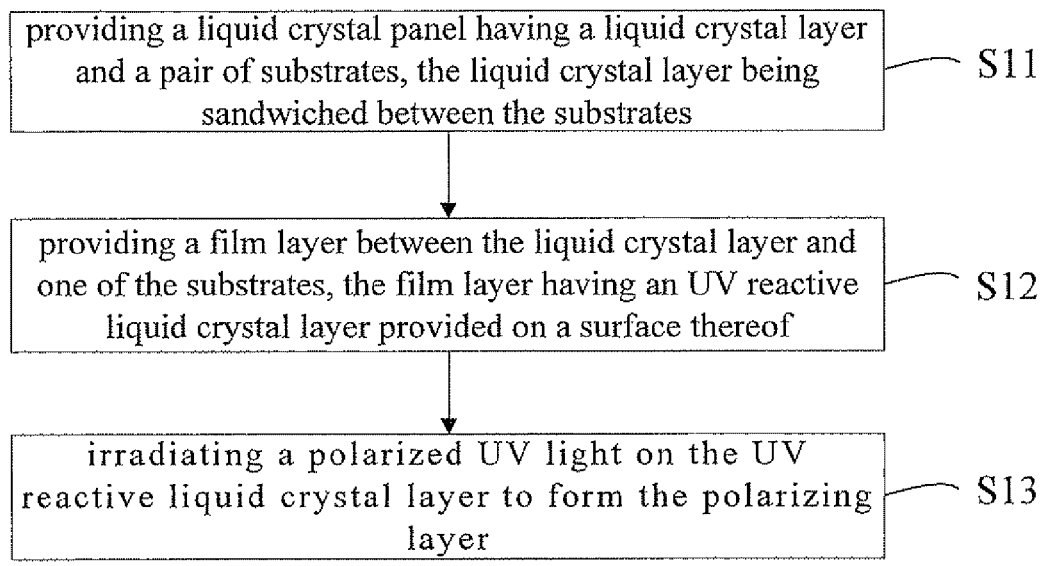
FIG. 1 is a flow chart of a method according to a first embodiment of the present invention for manufacturing a polarizing layer of a liquid crystal panel.

Please refer to FIG. 1, which is a flow chart of a method according to a first embodiment of the present invention for manufacturing a polarizing layer of a liquid crystal panel, and the method includes steps S11-S13.

In step S11, a liquid crystal panel having a liquid crystal layer and a pair of substrates is provided, and the liquid crystal layer is sandwiched between the substrates. The substrates are a color filter substrate and a thin film transistor array substrate, respectively.

In step S12, a film layer is provided between the liquid crystal layer and one of the substrates, the film layer has a UV reactive liquid crystal layer provided on a surface thereof. The film layer is selected from a group consisting of a color filter film, an alignment film, a transparent electrode, a gate electrode layer, a gate insulation layer, a source/drain layer, a semiconductor layer, and a protective insulation layer. The UV reactive liquid crystal layer which is made of UV reactive liquid crystal materials include RM257 made by the Merck company, LC242 made by the BASF company, or SLM 90519 made by the Wacker company.

In step S13, a polarized UV light is irradiated on the UV reactive liquid crystal layer to form the polarizing layer. The polarized UV light is foamed by a UV light irradiating through a polarizing sheet, and the UV light has a wavelength ranged from 200 nm to 400 nm.

Figure 2:
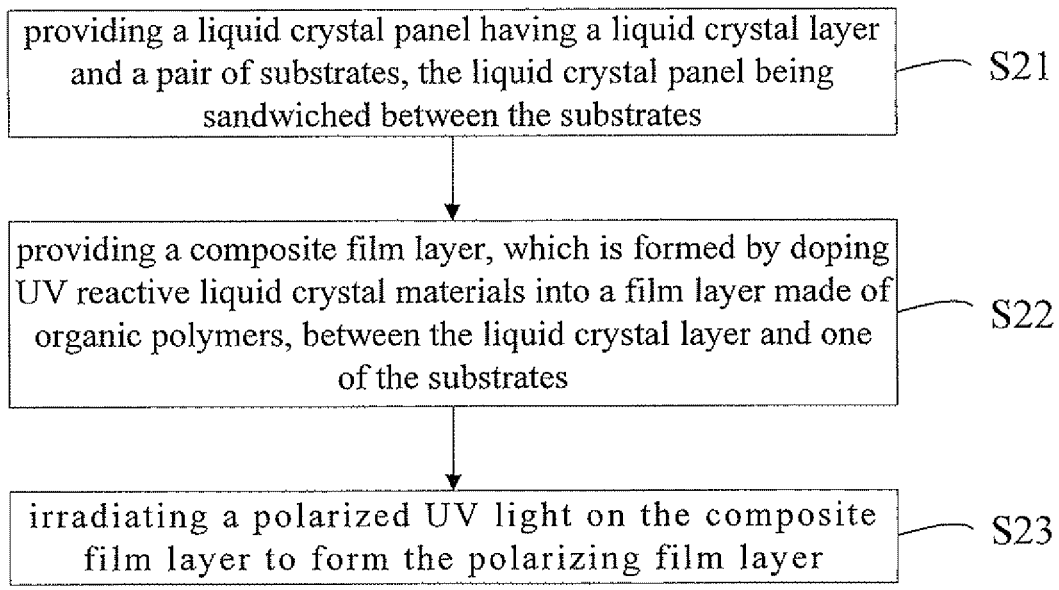
FIG. 2 is a flow chart of a method according to a second embodiment of the present invention for manufacturing a polarizing layer of the liquid crystal panel.

Please refer to FIG. 2, which is a flow chart of a method according to a second embodiment of the present invention for manufacturing a polarizing layer of a liquid crystal panel, and the method includes steps S21-S23.

In step S21, a liquid crystal panel having a liquid crystal layer and a pair of substrates is provided, and the liquid crystal layer is sandwiched between the substrates. The substrates are a color filter substrate and a thin film transistor array substrate, respectively.

In step S22, a composite film layer is provided between the liquid crystal layer and one of the substrates, and the composite film layer is formed by doping UV reactive liquid crystal materials into a film layer (such as a color filter film) which is made of organic polymers. The UV reactive liquid crystal materials include RM257 made by the Merck company, LC242 made by the BASF company, and SLM 90519 made by the Wacker company. The composite film layer can be divided into at least three areas, and each of said at least three areas of the first polarizing layer contains a colorant, and the colorants of the respective areas are different, thereby forming a color polarizing filter film.

In step S23, a polarized UV light is irradiated on the composite film layer to form the polarizing film layer. The polarized UV light is formed by a UV light irradiating through a polarizing sheet, and the UV light has a wavelength ranged from 200 nm to 400 nm. An irradiation process of the polarized UV light further includes a photo mask between a polarized UV light source and the composite film layer, and the areas of the composite film layer are separated.

Figure 3:
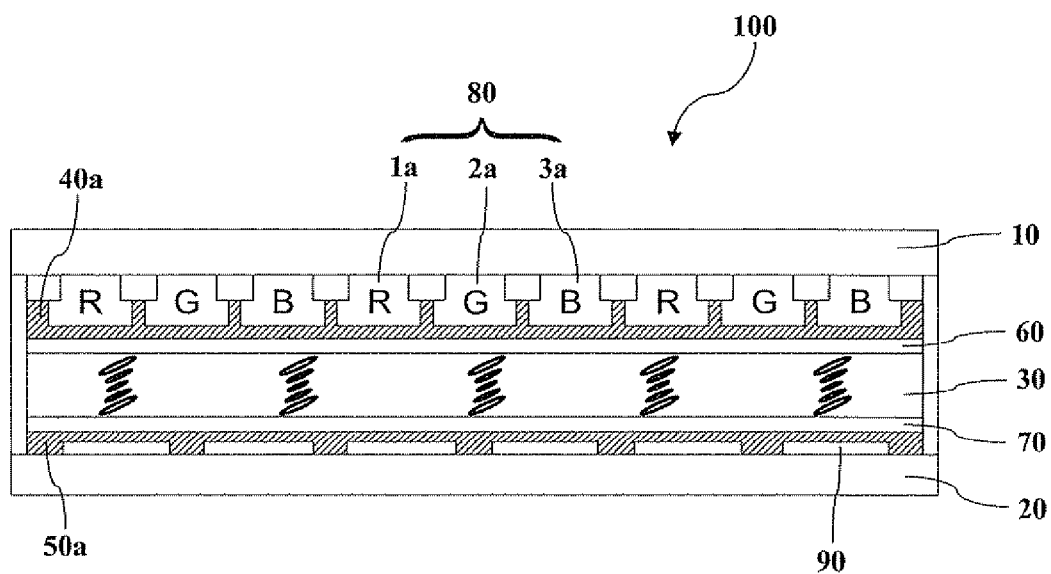
FIG. 3 is a schematic view of the liquid crystal panel according to the first embodiment of the present invention.

Please refer to FIG. 3, which is a schematic view of the liquid crystal panel made of the polarizing layer according to the first embodiment of the present invention. The liquid crystal panel 100 includes a first substrate 10, a second substrate 20, a liquid crystal layer 30, a first polarizing layer 40a, a second polarizing layer 50a, a first alignment film 60, and a second alignment film 70. In the present embodiment, the liquid crystal layer 30 is sandwiched between the first substrate 10 and the second substrate 20. The first substrate 10 is a color filter substrate, and the second substrate 20 is a thin film transistor array substrate. A color filter film 80 is disposed on a surface facing the liquid crystal layer 30 of the first substrate 10, and the color filter film 80 comprises a plurality of red sub-pixels 1a, a plurality of green sub-pixels 2a and a plurality of blue sub-pixels 3a. The first polarizing layer 40a covers a surface of the color filter film 80 of the first substrate 10, as well as filling slits among the red sub-pixels 1a, the green sub-pixels 2a and the blue sub-pixels 3a of the color filter film 80. The first alignment film 60 is sandwiched between the liquid crystal layer 30 and the first polarizing layer 40a. A plurality of transparent electrodes 90 are disposed on a surface facing the liquid crystal layer 30 of the second substrate 20. The second polarizing layer 50a covers a surface of the transparent electrodes 90 of the second substrate 20, as well as filling slits between the transparent electrodes 90. The second alignment film 70 is sandwiched between the liquid crystal layer 30 and the second polarizing layer 50a. The first polarizing layer 40a and the second polarizing layer 50a are made of polarized UV reactive liquid crystal materials having polarization properties.

Figure 4:
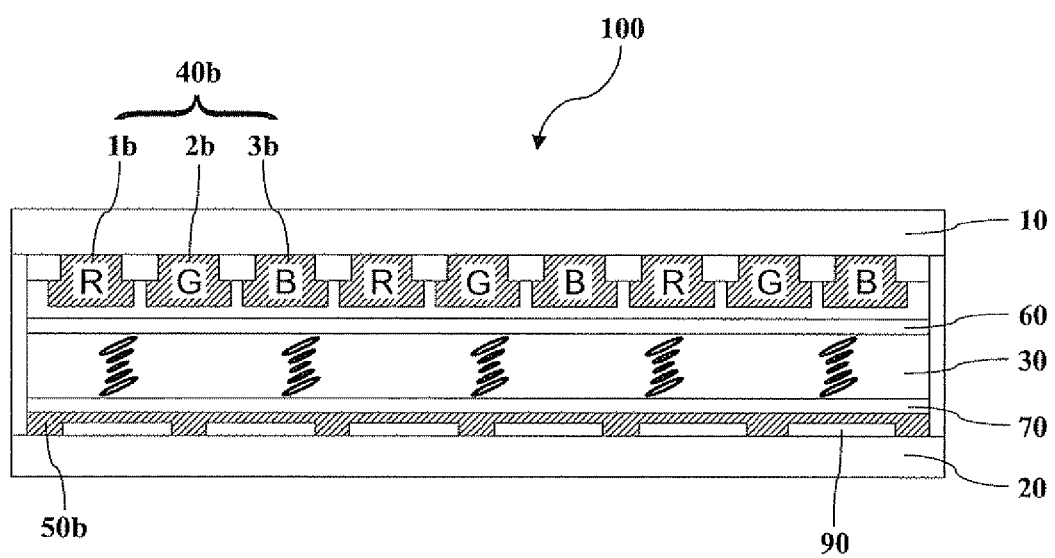
FIG. 4 is a schematic view of the liquid crystal panel according to the second embodiment of the present invention.

Please refer to FIG. 4, which is a schematic view of the liquid crystal panel made of the polarizing layer according to the second embodiment of the present invention. The liquid crystal panel 100 includes a first substrate 10, a second substrate 20, a liquid crystal layer 30, a color polarizing filter film 40b, a polarizing layer 50b, a first alignment film 60, and a second alignment film 70. In the present embodiment, the liquid crystal layer 30 is sandwiched between the first substrate 10 and the second substrate 20. The first substrate 10 is a color filter substrate, and the second substrate 20 is a thin film transistor array substrate. The color polarizing filter film 40b comprises a plurality of polarizing red sub-pixels 1b, a plurality of polarizing green sub-pixels 2b and a plurality of polarizing blue sub-pixels 3b. The color polarizing filter film 40b is disposed on a surface facing the liquid crystal layer 30 of the first substrate 10. The first alignment film 60 is sandwiched between the liquid crystal layer 30 and the color polarizing filter film 40b, and a surface of the first alignment film 60 contacts the liquid crystal layer 30. A plurality of transparent electrodes 90 are disposed on a surface facing the liquid crystal layer 30 of second substrate 20. The polarizing layer 50b covers a surface of the transparent electrodes 90 of the second substrate 20, as well as filling slits between the transparent electrodes 90. The second alignment film 70 is sandwiched between the liquid crystal layer 30 and the polarizing layer 50b. The color polarizing filter film 40b and the polarizing layer 50b are made of polarized UV reactive liquid crystal materials having polarization properties. Referring to two examples, the following specifically describes a method for manufacturing the color polarizing filter film 40b.

Embodiment 1

Figure 5A:
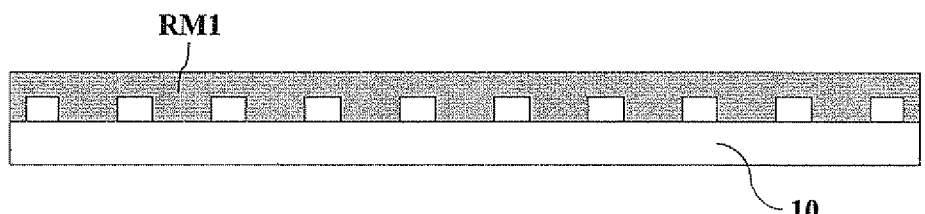
FIG. 5a is a schematic view of a first flow of an embodiment for manufacturing a color polarizing filter film in accordance with the second embodiment of the present invention.
Figure 5B:
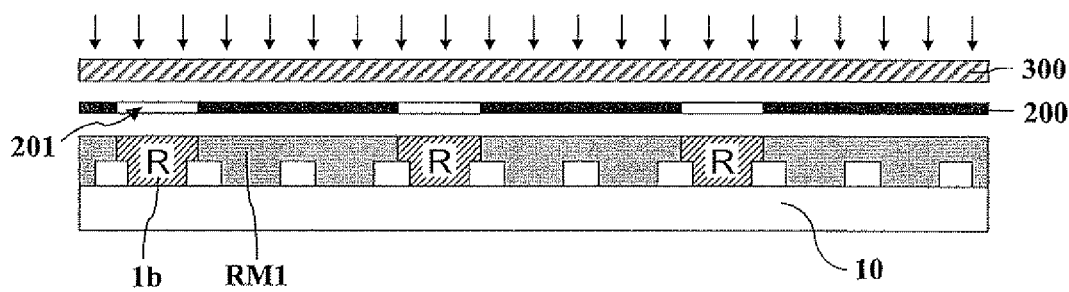
FIG. 5b is a schematic view of a second flow of the embodiment for manufacturing the color polarizing filter film in accordance with the second embodiment of the present invention.
Figure 5C:
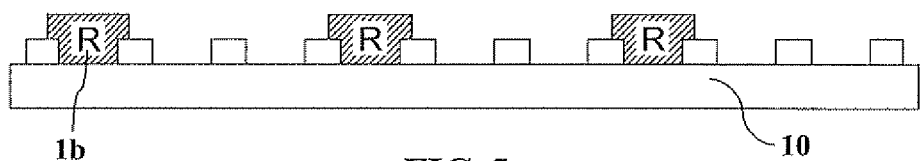
FIG. 5c is a schematic view of a third flow of the embodiment for manufacturing the color polarizing filter film in accordance with the second embodiment of the present invention.
Figure 5D:
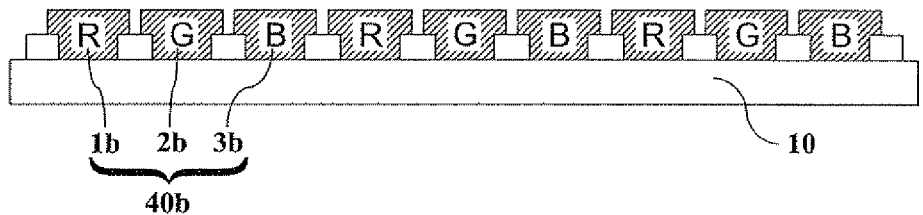
FIG. 5d is a schematic view of a fourth flow of the embodiment for manufacturing the color polarizing filter film in accordance with the second embodiment of the present invention.

Please refer to FIG. 4 and FIGS. 5a to 5d, in the color polarizing filter film 40b according to the embodiment of the present invention, an arrowhead in FIG. 5b shows a UV light source. Red dyes, green dyes, and blue dyes are first doped respectively into each of three UV light reactive liquid crystal materials of RM257 made by the Merck company, as well as respectively forming red reactive liquid crystal materials, green reactive liquid crystal materials, and blue reactive liquid crystal materials. The red reactive liquid crystal materials are coated on a surface facing the liquid crystal layer 30 of the first substrate 10 to form a red reactive liquid crystal layer RM1. A photo mask 200 having a plurality of hollowed-out positions 201 is disposed on the first substrate 10 having the red reactive liquid crystal materials. A polarized UV light which is formed of a UV light irradiating through a polarizing sheet 300 is passed through the hollowed-out positions 201 of the photo mask 200 to exposure areas of the red reactive liquid crystal layer RM1, thereby forming a plurality of polarizing red sub-pixels 1b. The polarizing red sub-pixels 1b are obtained on the surface of the first substrate 10 after removing the red reactive liquid crystal layer RM1 thereon. The green reactive liquid crystal materials and the blue reactive liquid crystal materials are respectively performed depend on a manufacturing process of FIGS. 5a to 5c, thereby forming a plurality of polarizing green sub-pixels 2b and a plurality of polarizing blue sub-pixels 3b. The color polarizing filter film 40b comprises the polarizing red sub-pixels 1b, the polarizing green sub-pixels 2b and the polarizing blue sub-pixels 3b (as shown in FIG. 5d).

Embodiment 2

Figure 6A:
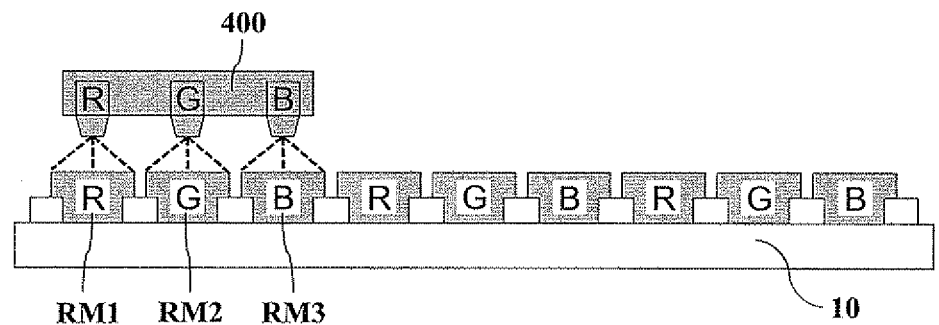
FIG. 6a is a schematic view of a first flow of another embodiment for manufacturing a color polarizing filter film in accordance with the second embodiment of the present invention.
Figure 6B:
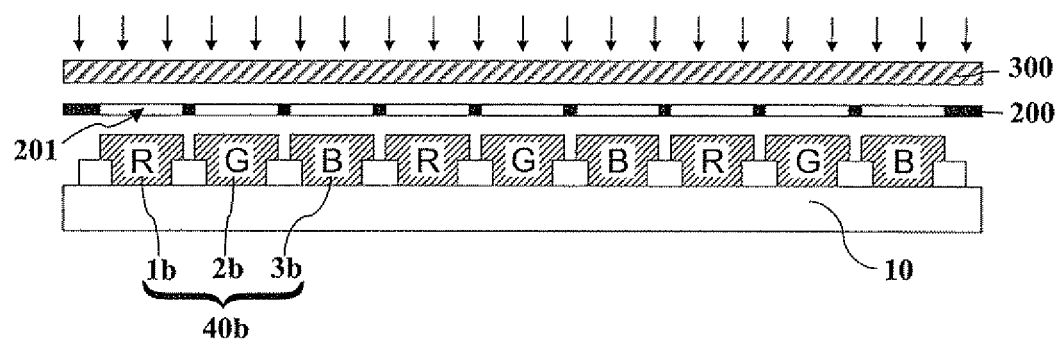
FIG. 6b is a schematic view of a second flow of such another embodiment for manufacturing the color polarizing filter film in accordance with the second embodiment of the present invention.
Figure 6C:
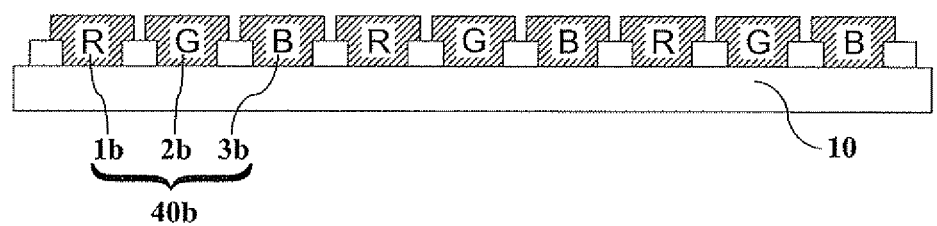
FIG. 6c is a schematic view of a third flow of such another embodiment for manufacturing the color polarizing filter film in accordance with the second embodiment of the present invention.

Please refer to FIG. 4 and FIGS. 6a to 6e, in the color polarizing filter film 40b according to another embodiment of the present invention, an arrowhead in FIG. 6b shows a UV light source. Red dyes, green dyes, and blue dyes are first doped respectively into each of three UV light reactive liquid crystal materials of RM257 made by the Merck company, as well as respectively forming red reactive liquid crystal materials, green reactive liquid crystal materials, and blue reactive liquid crystal materials. The red reactive liquid crystal materials, the green reactive liquid crystal materials and the blue reactive liquid crystal materials are filled into an ink jet system 400. The red reactive liquid crystal materials, the green reactive liquid crystal materials and the blue reactive liquid crystal materials are sprayed on a surface facing the liquid crystal layer 30 of the first substrate 10 by the ink jet system 400, thereby forming a plurality of red reactive liquid crystal layers RM1, a plurality of green reactive liquid crystal layers RM2 and a plurality of blue reactive liquid crystal layers RM3. A photo mask 200 having a plurality of hollowed-out positions 201 is disposed on the first substrate 10 having the red reactive liquid crystal layers RM1, the green reactive liquid crystal layers RM2 and the blue reactive liquid crystal layers RM3. A polarized UV light which is formed of a UV light irradiating through a polarizing sheet 300 is passed through the hollowed-out positions 201 of the photo mask 200 to exposure areas of the red reactive liquid crystal layers RM1, the green reactive liquid crystal layers RM2 and the blue reactive liquid crystal layers RM3, thereby forming a plurality of polarizing red sub-pixels 1b, a plurality of polarizing green sub-pixels 2b and a plurality of polarizing blue sub-pixels 3b. The color polarizing filter film. 40b comprises the polarizing red sub-pixels 1b, the polarizing green sub-pixels 2b and the polarizing blue sub-pixels 3b. The color polarizing filter film 40b according to the FIG. 6c is obtained after removing residual reactive liquid crystal materials.

As above-mentioned, the present invention provides a polarizing layer of a liquid crystal panel and the manufacturing method thereof. A polarized UV light is irradiated on a UV reactive liquid crystal layer to form a polarized UV reactive liquid crystal layer having polarization properties, and then it is used as the polarizing layer of the liquid crystal panel. The polarizing layer brings the advantages of being thin in the thickness and a higher temperature resistance, as well as having a simple manufacturing process, thereby reducing production costs.

It should be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A manufacturing method for a polarizing layer of a liquid crystal panel comprising steps of:
providing a liquid crystal panel having a liquid crystal layer and a pair of substrates, the liquid crystal panel being sandwiched between the substrates;

providing a composite film layer, which is formed by doping UV reactive liquid crystal materials into a film layer made of organic polymers, between the liquid crystal layer and one of the substrates; and irradiating a polarized UV light on the composite film layer to form the polarizing film layer, wherein the film layer is a color filter film.

2. The manufacturing method of claim 1, wherein the composite film layer is divided into at least three areas.

3. The manufacturing method of claim 2, wherein each of said at least three areas of the composite film layer contains a colorant, and the colorants of the respective areas are different, thereby forming a color polarizing filter film.

4. The manufacturing method of claim 2, wherein an irradiation process of the polarized UV light further comprises using a photo mask for irradiating different areas.

5. The manufacturing method of claim 1, wherein the polarized UV light is formed by a UV light irradiating through a polarizing sheet.

6. The manufacturing method of claim 5, wherein the UV light has a wavelength ranged from 200 nm to 400 nm.

7. The manufacturing method of claim 1, wherein the pair of substrates are a color filter substrate and a thin film transistor array substrate, respectively.

\* \* \* \* \*